US010789752B2

(12) United States Patent
Yu

(10) Patent No.: US 10,789,752 B2
(45) Date of Patent: Sep. 29, 2020

(54) THREE DIMENSIONAL ACQUISITION AND RENDERING

(71) Applicant: Jingyi Yu, Newark (DE)

(72) Inventor: Jingyi Yu, Newark (DE)

(73) Assignee: Jingyi Yu, Newark (DE)

( * ) Notice: Subject to any disclaimer, the term of this patent is extended or adjusted under 35 U.S.C. 154(b) by 0 days.

(21) Appl. No.: 16/004,434

(22) Filed: Jun. 11, 2018

(65) Prior Publication Data

US 2018/0293774 A1    Oct. 11, 2018

Related U.S. Application Data

(63) Continuation of application No. PCT/US2016/067635, filed on Dec. 19, 2016.

(51) Int. Cl.
| G06T 13/20 | (2011.01) |
| G06T 15/06 | (2011.01) |
| G06T 15/20 | (2011.01) |
| G06T 15/04 | (2011.01) |
| G06T 15/10 | (2011.01) |
| G06K 9/46 | (2006.01) |
| G06K 9/62 | (2006.01) |
| H04N 13/204 | (2018.01) |

(52) U.S. Cl.
CPC .............. *G06T 13/20* (2013.01); *G06T 15/04* (2013.01); *G06T 15/06* (2013.01); *G06T 15/10* (2013.01); *G06T 15/205* (2013.01); *G06K 9/4671* (2013.01); *G06K 9/6212* (2013.01); *G06T 2200/04* (2013.01); *G06T 2200/08* (2013.01); *H04N 13/204* (2018.05)

(58) Field of Classification Search
None
See application file for complete search history.

(56) References Cited

U.S. PATENT DOCUMENTS

| 6,072,496 | A | * | 6/2000 | Guenter | G06K 9/00201 345/419 |
| 2010/0329358 | A1 | * | 12/2010 | Zhang | H04N 19/597 375/240.26 |
| 2012/0281873 | A1 | * | 11/2012 | Brown | G06T 19/006 382/103 |
| 2015/0294492 | A1 | * | 10/2015 | Koch | H04N 13/243 345/426 |
| 2016/0093105 | A1 | * | 3/2016 | Rimon | G06T 19/006 345/633 |

\* cited by examiner

*Primary Examiner* — Kyle Zhai
(74) *Attorney, Agent, or Firm* — Kilpatrick Townsend & Stockton, LLP

(57) ABSTRACT

A method and system of using multiple image cameras or multiple image and depth cameras to capture a target object. Geometry and texture are reconstructed using captured images and depth images. New images are rendered using geometry based rendering methods or image based rendering methods.

20 Claims, 6 Drawing Sheets

THREE DIMENSIONAL ACQUISITION AND RENDERING

This application is a continuation of International Application No. PCT/US2016/067635, filed on Dec. 19, 2016, which claims priority to U.S. Provisional Application No. 62/278,269, filed on Jan. 13, 2016. Both of the aforementioned applications are hereby incorporated by reference in their entireties.

High quality 3-Dimensional (3D) reconstructions of real humans and objects using multiple cameras and light sources have become popular for new consumer media platforms, especially for virtual reality and augmented reality. Such 3D videos are intended to help the viewer get more immersion of the scene by displaying it with a high dimension of degree of freedom. In such videos, the viewer can walk around in a 3D environment and view the rendered people or objects in 3D from different positions and from different directions. However, conventional image and video real-time capture only worked in two-dimensions, and thus lack the ability to convey information regarding the 3D model, texture, or other 3D aspects of the human.

The 3D capture systems that are presented in the market only work for a fixed viewpoint of 3D capture, so the viewer cannot move around. This limitation leads to lack of realism for the viewer when the viewer is wearing a Head Mounted Display (HMD). A method and system is desired that is capable of producing high quality 3D images and videos of a human, object, or scene thereof, captured by a multi-camera array. The captured human, object, or scene can then be displayed to a user where the user can view the human, object, or scene in real time and from different views.

BRIEF DESCRIPTION OF THE DRAWINGS

FIG. 2b describes an image based rendering method that is the details of the rendering 2003 process of FIG. 2a.

FIG. 3 describes in detail the reconstruction process 2002 of FIG. 2a.

FIG. 4 describes an alternative example method to the pre-calibration 2000, capture 2001 and reconstruction 2002 of FIG. 2a.

DETAILED DESCRIPTION

In an example embodiment of the 3D capture system of the present invention, multiple views of images of the human, object, or scene thereof are captured at different locations and are used to generate a 3D model and high resolution texture map of the human, object, or scene thereof (herein simply referred to as the scene). The system enables the creation of a 3D demonstration of a scene, which can be reproduced from different view positions. The viewer, wearing a Virtual Reality (VR) Head Mounted Display (HMD), is able to view duplicated features and lighting from a scene and in real-time. This desirably generates a real 3D perception in the viewer's mind, to create the impression that the viewer is looking at a real scene in 3D. Moreover, the disclosed embodiments are capable of being used for movie special effects by editing the reconstructed 3D model and texture.

Detailed descriptions of the above example embodiments may be illustrated herein.

Figure 1A:
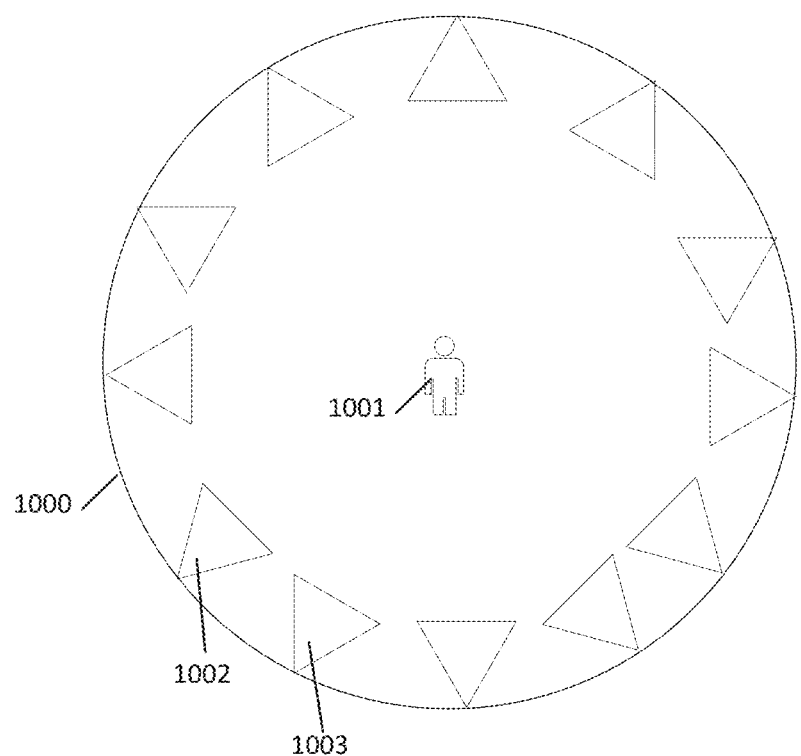
FIG. 1a describes an example 3D capture system.

FIG. 1a describes an example 3D capture system. In the capture system, there are multiple cameras as represented by example cameras 1002 & 1003, mounted in a geodesic sphere 1000 pattern, such that a target scene may be situated at the center of the sphere. The example embodiment may use an outside-in geodesic sphere, due to its uniformity and density; however, in other example embodiments, either inside-out views or outside-in configurations may be used. Moreover, configurations may be in the form of a sphere, grid, box, or other shape configurations.

The sphere allows for distances between the target scene 1001 and cameras to be nearly the same. In other instances, adjustments may be needed during calibration, and thus the cameras may be mounted in other patterns, such as a cube or octagon-shape, as needed. All the cameras may utilize the same sensor size and lens (similar field of view (FOV) and focal length. However, for calibration reasons some cameras may have different sensors and lenses. All the cameras may be synchronized and connected by a server or computing hardware. Each camera may have its own storage space on board and can do image (i.e. jpeg) compression on the fly. In other example embodiments, the cameras may not have storage space and, instead, send raw data to the cloud to be processed and stored.

Regarding the cameras, any image or video capture can be used. For example, one could use digital single lens reflex (DSLR) cameras. The more cameras that are provided, the more images captured, and thus the higher the accuracy of the capture and eventual rendering. More cameras allow the process to cover more of the object to produce high resolution texture results. All the camera modules are connected to a computing board that is used to synchronize all the cameras. The cameras are also connected to a communication medium that allows for the transfer of the raw image capture data. The communication medium may be for the purpose of communication to a single desktop, or through the internet, intranet, a cloud or server farm, WiFi for connection through routers, or other network communication means. All the cameras are mounted such that each individual camera may be adjusted such that the distances between the cameras may be increased or decreased to account for the depth scale and viewing space.

Figure 2A:
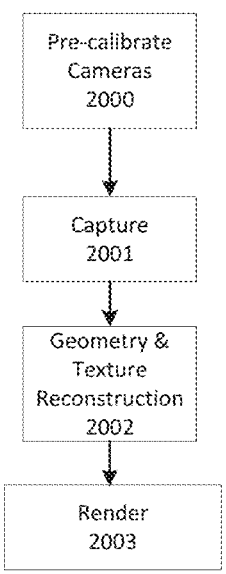
FIG. 2a describes the complete 3D capture and rendering process.

FIG. 2a describes the complete 3D capture and rendering process.

All the cameras are pre-calibrated 2000 and in a fixed position during capture (though they may be moved if on a known path). All the cameras are mounted on the geodesic sphere rail or other shapes as needed. The desire is that all the cameras create a uniform sample on the sphere, however, some of the camera still has small position shifts. This difference in distance is rectified by fitting a sphere with a known radius (or 3D geometry with known distance from the object) for all the camera positions. All the camera position are shifted to this sphere in 3D space and all the camera views are rotated in the direction of the center of the sphere. Therefore, all the cameras take a uniform sample on the sphere, which will be useful during rendering. The color space for all the cameras is also calibrated because all the images need to be consistent for the 3D reconstruction. To do the color calibration, a color checkerboard is placed at the sphere center and all the cameras capture the raw data. The process fits a color matching curve for each camera. Therefore, all the captured data will be projected by this curve to do the color calibration. An additional calibration method includes the mounting of multiple light sources on the sphere to create a uniform illumination source. All the light source directions are calibrated in order to separate specular high light from the image base on the light direction. To calibrate the light source, a mirror ball (or other reflection source) is placed at the center of the sphere, and the calibrated cameras are focused at the mirror ball. An image or video is captured per camera with one enabled light source each time. Based on the camera extrinsic parameters and the reflection from the mirror ball, the incident light direction can be estimated for each image and then the light source position and direction in can be calibrated in 3D space.

During the capture 2001 process, all the cameras capture hundreds of images of different views of the object or objects (which could be a human) at different positions. All the raw images may be stored (locally or transferred outside the camera for storage), and the images may also be compressed (i.e. in JPEG format) and transferred in real-time so that it may be suitable for use in video capture. Alternatively, the images may be processed in real-time, thus not needing storage or compression.

After capture, the multi-view 3D reconstruction 2002 process is applied to generate a high quality 3D model of the target object or objects. Simultaneously, the process separates out the high precision texture and surface normal. For example, in the case of humans, the texture would be skin texture. The reconstruction process can be divided into two parts: the 3D reconstruction and the albedo & specular separation. For the 3D reconstruction, the traditional multi-view 3D reconstruction and structure from motion can produce a high accuracy 3D geometry model. For the albedo and specular, a photometric stereo method is used to extract a high resolution normal map and separate specular high light from the albedo part, which can be used for digital re-lighting special effects. If the system contains a very large number of cameras with very high resolutions where a total image data is huge, the process utilizes a modified structure from motion 3D reconstruction method that could handle large-level input data effectively.

The rendering 2003 process is programmed to re-generate the object or objects in 3D by rendering the 3D model with texture in real time onto a display, such as an HMD. This could be done using standard geometry based techniques. In order to render the object in a more realistic manner, a modified image based rendering technique, as described in FIG. 2b, may be applied. In order to obtain the high quality 3D geometry of the object or objects, a modified multi-view stereo reconstruction that combines with structure from motion is adopted. To reduce the specular high light from the object's texture, the lighting system is also mounted on the capture dome, and all the light direction and lumens are pre-calibrated. And during the reconstruction process, all the images are undistorted by using their own calibration intrinsic parameters, and rectified by their extrinsic parameters. Both intrinsic and extrinsic parameters are obtained during the pre-calibration process. The color for each image is also corrected by their color calibration results.

Figure 2B:
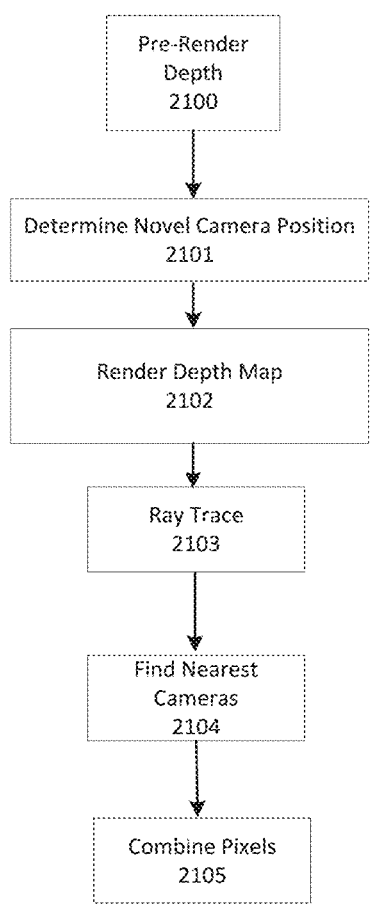

FIG. 2b describes an image based rendering method that is the details of the rendering 2003 process of FIG. 2a. The depth is pre-rendered 2100 for each image from the 3D model and camera extrinsic parameters, i.e. how the cameras positions are related to each other. During the rendering process, for each frame, the position of the novel camera (i.e. the x-y-z location and the direction) is determined 2101, whether by a position tracker on an HMD or a position determined by a mouse movement or any other method used to detect the novel camera position. Then depth map is rendered 2102 based on the reconstructed 3D geometry, as explained in the reconstruction 2002 process of FIG. 2a. For each pixel, a ray is traced 2103 with the length from the rendered depth map. The nearest cameras, for example it could be four, to the position on the sphere, which will be used for final image rendering, are found 2104. The 3D space is divided into voxels based on the depth map. A voxel is equivalent to a pixel in an image, so rays are intersecting voxels. After the ray intersects the voxel of the object, the intersection is traced back from the voxel to the previously determined nearest cameras and then the process determines which camera is not occluded by other voxel. The pixels from the cameras, i.e. the four pixels, are linearly combined 2105 based on the bilinear interpolation. The above processes may be done in real-time, for example, by utilizing a graphic processing unit (GPU).

Figure 3:
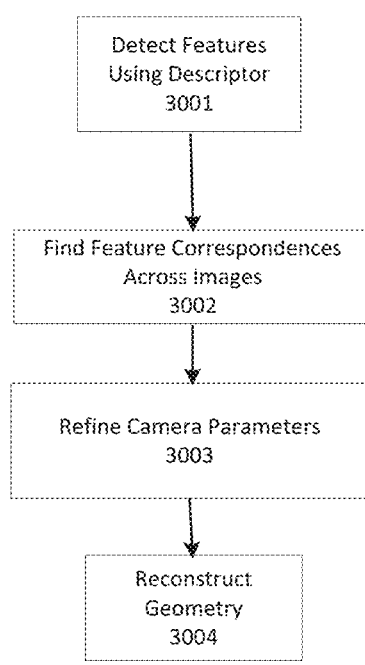

FIG. 3 describes in detail the reconstruction process 2002 of FIG. 2a. At the first stage, points are detected in all the photos which are stable under viewpoint and lighting variations and generates a descriptor for each point based on its local neighborhood 3001. A Gaussian Pyramid is built for each image, and then a laplacian of Gaussian (LoG) is used as a blob detector. After that, a threshold is set to filter out low contrast pixel, and only set high value pixel as key point. These descriptors are used later to detect correspondences across the images 3002. This step is similar to some well-known approach such as SIFT and SURF, but a more reliable descriptor for higher alignment quality is used by add non-lambertian surface assumption to the descriptor, which contain normal and specular high light information. Although the system is well calibrated, since each camera may have small shifting or orientation change, a bundle-adjustment is used to refine the camera intrinsic and extrinsic parameters for each image before reconstruction step 3003. The method uses a greedy process to find approximate camera locations and refines them later using a modified bundle-adjustment method. At this step a patch-based multi-view stereo for dense point cloud and a multi-view reconstruction (based on PMVS2 and or CMVS) is used 3004. In addition, the constraint for smooth depth map computation is added. To deal with potential large number of images and high resolution, an out-of-core method to accomplish piece-wise reconstruction can also be used, which reconstructs each small piece of the 3D object individually to reduce memory usage during computation and then fuses all the pieces together using Iterative closest point (ICP) method. This processing can be done locally or in the cloud across a computer network.

Figure 4:
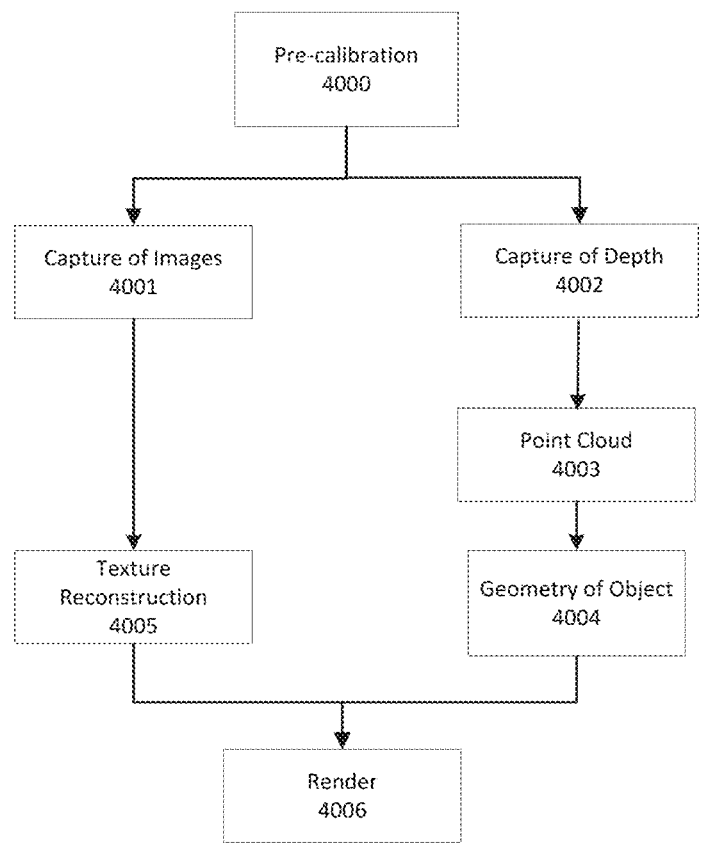

FIG. 4 describes an alternative example method to the pre-calibration 2000, capture 2001 and reconstruction 2002 of FIG. 2a. The system combines multiple depth sensors and multiple traditional RGB color camera sensor. All the sensors capture the target object or objects simultaneously. By fusion with the depth results and color information, a high accuracy 3D geometry model and color texture map are obtained.

The depth cameras are first pre-calibrated 4000 to get their positions and orientations with respect to each other. The RGB sensors are also pre-calibrated in relation to each other. Multiple images of a checkerboard pattern are captured with different orientations. By calculating the pixel location for all feature corners of the checkerboard, extrinsic and intrinsic parameters for each RGB camera are obtained. In an example of depth sensor (Structure Light based) calibration, the IR projector is blocked and replaced with a IR planer light source to illuminate the scene. And similar to the RGB camera calibration, multiple images of a checkerboard are captured to estimate intrinsic parameters. For the extrinsic parameters, several auxiliary cameras are placed next to the depth sensor, and visible white lights are used to illuminate the scene, and then stereo camera calibration is applied to compute the parameters.

All the depth sensor and RGB sensors are mounted on the geodesic dome, and the target object or objects are placed at the center. The desired areas of the object to be reconstructed are covered so that there are no holes when the point cloud is generated. Images 4001 and depth images 4002 of the target are captured using the RGB and depth sensors.

A point cloud is a set of voxels which is captured in the previous stage. To construct the point cloud 4003, every pixel in the depth image is back projected. Since the depth at each pixel is known, the exact 3D position of the point is known. The point cloud constructed not only contains the object, but also the background. The background is assumed to be quite far so that it becomes easier to segment it out on the basis of its depth value. To make it more rigorous, the object is assumed to have depth values within a certain range. Depth sensors can be prone to measurement errors that lead to sparse outliers which may corrupt the registration process. These outliers must be removed from the point clouds before the registration process using a smooth constraint denoise method based on Block-matching and 3D filtering (BM3D) to smooth out the outliers. With many point clouds of the same object captured from different viewpoints, the discrete point clouds are fused to form a closest 3D model. These point clouds are registered using an Iterative closest point (ICP) method. The point cloud reconstruction can also be improved using the images and computer vision methods.

The output from the image based or depth based reconstruction is a dense point cloud in 3D space. Delaunay or other triangulation methods is used to obtain the final geometry 4004 for rendering.

Textures are reconstructed 2002, 4005 by parameterizing the geometry mesh or triangle mesh possibly cutting it in smaller pieces, and then blending source photos to form a high resolution texture map. The captured images still have higher resolution than the 3D reconstruction model. Images are re-projected back onto the model and create a new UV map (texture map) for each small pieces.

Since all the cameras are synchronized, a moving object can be considered as static object for each frame. Cameras can capture objects in video mode and use the above algorithms frame by frame. Alternatively a single texture and/or geometry can be used and animated using standard computer graphics techniques. Geometry animation is generated using interpolation across frames.

The method of rendering 2003, 4006 and displaying images from the system may be applied. An example is displaying the object onto a head mounted display. There are two solutions. The first is based on standard geometry based techniques using only the generated 3D model and texture map to render the 3D object. The second solution is a light field based rendering technique to render the 3D object, FIG. 2b, which can produce high realistic rendering results by combining the capture image and reconstructed 3D model. And since a light field data structure is used, the viewer can dynamically change the lighting by different environment map.

Figure 5:
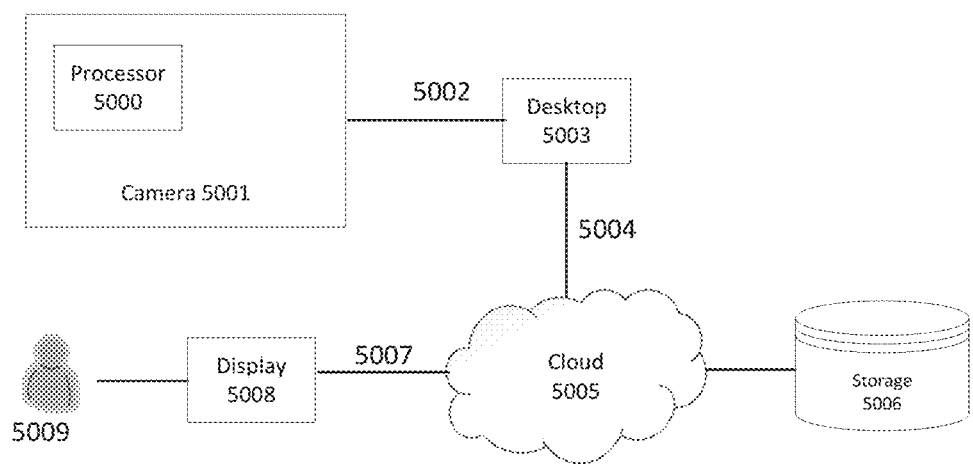
FIG. 5 illustrates the configuration of an example embodiment system of a 3D capture system.

FIG. 5 illustrates the configuration of an example embodiment system of a 3D capture system. In one example embodiment of a geodesic sphere there are cameras 5001, each with an onboard processor 5000 that can be used to capture one or more images. There may also be associated depth cameras. The image data may be transferred to a desktop 5003 across a communication medium 5002, such as a bus, wifi, or other network medium. The desktop can render the images and store the rendered images in storage 5006 by passing the data through a communication medium 5004 through the cloud 5005. The cloud could be any network, internet, intranet, or other network grouping of routers and/or processors. An end user 5009 can also retrieve those images from storage to the end display 5008.

Several example embodiments of the present invention are specifically illustrated and described herein. The advantages and features of the application are of a representative sample of embodiments only, and are not exhaustive and/or exclusive. They are presented only to assist in understanding and teaching the claimed principles. It should be understood that they are not representative of all claimed inventions. Moreover, they are not to be limited to the technologies or devices described herein. That an alternate embodiment may not have been presented is not a disclaimer of such alternate embodiment. It will be appreciated and understood that other embodiments may be utilized and functional, logical, organizational, structural and/or topological modifications may be made without departing from the scope and/or sprit of the embodiments discussed herein relative to those not discussed herein other than it is for purposes of non-repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others.

In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of an individual, entity, and/or enterprise user, database configuration and/or relational model, data type, data transmission and/or network framework, syntax structure, and/or the like, various embodiments of the invention, may be implemented that enable a great deal of flexibility and customization.

What is claimed is:

1. A method of rendering new images, comprising:
  acquiring a set of images of a scene using one or more image cameras, wherein the one or more image cameras are arranged in a geodesic sphere around the scene and each image camera of the one or more image camera produces a separate image of the scene of the set of images of the scene;

acquiring a set of depth images of the scene using one or more depth cameras, wherein the one or more depth cameras are arranged in the geodesic sphere around the scene and each depth camera of the one or more depth cameras produces a separate depth image of the set of depth images;

for each image in the set of depth images, converting the depth images to geometric models representing both a scene object associated with the scene and a background of the scene;

receiving, from a position tracker on a head mounted device, a position of a novel camera, wherein the novel camera is not located on the geodesic sphere;

rendering new three-dimensional (3D) images for the novel camera from the geometric models and texture maps using a geometry-based rendering technique.

2. A method of claim 1, wherein the geometry-based rendering technique is rasterization.

3. A method claim 1, wherein the geometry-based rendering technique is ray-tracing.

4. A method of claim 1, wherein a scene object is static and one model and set of textures is converted for that scene object.

5. A method of claim 1, wherein a scene object is animated.

6. A method of claim 5, wherein every frame of the animated scene object has a separate geometric model and texture map.

7. A method of claim 5, wherein the animated scene object has a single texture map and every frame of the animated scene object has a separate geometric model.

8. A system for creating a rendering of images comprising:

one or more processors; and a memory coupled with the one or more processors, the memory configured to store instructions that when executed by the one or more processors cause the one or more processors to:

acquire a set of images of a scene using one or more image cameras, wherein the one or more image cameras are arranged in a geodesic sphere around the scene and each image camera of the one or more image camera produces a separate image of the scene of the set of images of the scene;

acquire a set of depth images of the scene using one or more depth cameras, wherein the one or depth cameras are arranged in the geodesic sphere around the scene and each depth camera of the one or more depth cameras produces a separate depth image of the set of depth images;

for each image in the set of depth images, convert the depth image to geometric model representing both a scene object associated with the scene and a background of the scene;

blend each image of the set of images of a scene to generate a single texture map of the scene;

receive, from a position tracker on a head mounted device, a position of a novel camera, wherein the novel camera is not located on the geodesic sphere;

render new three-dimensional (3D) images for novel camera from the geometric models and the texture map using a geometry-based rendering technique.

9. The system of claim 8, wherein the geometry-based rendering technique is rasterization.

10. The system of claim 8, wherein the geometry-based rendering technique is ray-tracing.

11. The system of claim 8, wherein the scene object is static and one model and set of textures is converted for that scene object.

12. The system of claim 8, wherein the scene object is animated.

13. The system of claim 12, wherein the scene is animated and every frame of the animated scene has a separate geometric model and texture map.

14. The system of claim 12, wherein the scene is animated and the animated scene has a single texture map and every frame of the animated scene has a separate geometric model.

15. A non-transitory computer-readable storage medium having stored thereon instructions for causing at least one computer system to create a rendering of images comprising, the instructions comprising:

acquiring a set of images of a scene using one or more image cameras, wherein the one or more image cameras are arranged in a geodesic sphere around the scene and each image camera of the one or more image camera produces a separate image of the scene of the set of images of the scene;

acquiring a set of depth images of the scene using one or more depth cameras, wherein the one or depth cameras are arranged in the geodesic sphere around the scene and each depth camera of the one or more depth cameras produces a separate depth image of the set of depth images;

for each image in the set of depth images, converting the depth image to geometric model representing both a scene object associated with the scene and a background of the scene;

blending each image of the set of images of a scene to generate a single texture map of the scene;

receiving, from a position tracker on a head mounted device, a position of a novel camera, wherein the novel camera is not located on the geodesic sphere;

rendering new three-dimensional (3D) images for novel camera from the geometric models and the texture map using a geometry-based rendering technique.

16. The non-transitory computer-readable storage medium of claim 15, wherein the geometry-based rendering technique is rasterization.

17. The non-transitory computer-readable storage medium of claim 15, wherein the geometry-based rendering technique is ray-tracing.

18. The non-transitory computer-readable storage medium of claim 15, wherein the scene object is static and one model and set of textures is converted for that scene object.

19. The non-transitory computer-readable storage medium of claim 15, wherein the scene object is animated.

20. The non-transitory computer-readable storage medium of claim 19, wherein the scene is animated and every frame of the animated scene has a separate geometric model and texture map.

* * * * *